(12) United States Patent
Okamoto et al.

(10) Patent No.: US 11,991,328 B2
(45) Date of Patent: May 21, 2024

(54) READING APPARATUS

(71) Applicant: Brother Kogyo Kabushiki Kaisha, Nagoya (JP)

(72) Inventors: Yoshihiro Okamoto, Komaki (JP); Toshiki Motoyama, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/191,028

(22) Filed: Mar. 28, 2023

(65) Prior Publication Data
US 2023/0319207 A1    Oct. 5, 2023

(30) Foreign Application Priority Data

Apr. 1, 2022 (JP) .................................. 2022-061922

(51) Int. Cl.
*H04N 1/00* (2006.01)
(52) U.S. Cl.
CPC .............................. *H04N 1/00816* (2013.01)
(58) Field of Classification Search
CPC .......... G03B 27/50; G03B 27/62; H04N 1/00; H04N 1/00748; H04N 1/0079; H04N 1/0281; H04N 1/0313; H04N 1/047; H04N 1/10; H04N 1/1017; H04N 1/193; H04N 2201/0081; H04N 2201/0472; H04N 2201/04729; H04N 2201/04731; H04N 2201/04751
USPC ....................................................... 358/474
See application file for complete search history.

(56) References Cited

U.S. PATENT DOCUMENTS

| | | | | |
|---|---|---|---|---|
| 2,018,629 | A * | 10/1935 | Berthold | B65D 5/68 229/125.21 |
| 2006/0285182 | A1* | 12/2006 | Suzuki | H04N 1/00015 358/474 |
| 2007/0065037 | A1* | 3/2007 | Honda | H04N 1/00681 382/274 |
| 2010/0165421 | A1* | 7/2010 | Yamamoto | G06V 10/24 358/474 |
| 2010/0277776 | A1* | 11/2010 | Osakabe | H04N 1/047 358/474 |

(Continued)

FOREIGN PATENT DOCUMENTS

| | | |
|---|---|---|
| JP | H04-94858 U | 8/1992 |
| JP | 2010-263318 A | 11/2010 |
| JP | 2021-164077 A | 10/2021 |

*Primary Examiner* — Negussie Worku
(74) *Attorney, Agent, or Firm* — Kenealy Vaidya LLP

(57) ABSTRACT

A reading apparatus, having a document placement table, a cover, a reader, and a controller, is provided. The cover has, on a facing surface thereof that faces the reader, a reference section having a first edge extending in a sub-scanning direction and a second edge extending in a main scanning direction, and a colored part on peripheries of the reference section. The colored part is colored along the first edge and along the second edge. The controller is configured to operate the reader to read the colored part and the peripheries of the colored part, detect a first position being a position of the first edge in the main scanning direction and a second position being a position of the second edge in the sub-scanning direction in an outcome of reading, and determine a reading range based on the first position and the second position.

11 Claims, 5 Drawing Sheets

(56) References Cited

U.S. PATENT DOCUMENTS

| | | | |
|---|---|---|---|
| 2011/0181920 A1* | 7/2011 | Kim | H04N 1/00737 |
| | | | 358/474 |
| 2018/0063359 A1* | 3/2018 | Netsu | H04N 1/486 |
| 2018/0343350 A1* | 11/2018 | Une | H04N 1/0044 |
| 2019/0124229 A1* | 4/2019 | Ishino | H04N 1/3873 |
| 2020/0045195 A1* | 2/2020 | Hachisuga | H04N 1/053 |
| 2020/0314277 A1* | 10/2020 | Shumiya | H04N 1/00824 |
| 2022/0210285 A1* | 6/2022 | Maeda | H04N 1/00708 |
| 2022/0210286 A1* | 6/2022 | Motoyama | H04N 1/0313 |
| 2022/0345573 A1* | 10/2022 | Sugawara | H04N 1/00063 |
| 2023/0027157 A1 | 1/2023 | Aoyama et al. | |
| 2023/0143978 A1* | 5/2023 | Ishida | H04N 1/00018 |
| | | | 358/474 |
| 2023/0254425 A1* | 8/2023 | Yamamoto | H04N 1/3873 |
| | | | 358/1.2 |

\* cited by examiner

READING APPARATUS

REFERENCE TO RELATED APPLICATIONS

This application claims priority from Japanese Patent Application No. 2022-061922 filed on Apr. 1, 2022. The entire content of the priority application is incorporated herein by reference.

BACKGROUND ART

A reading apparatus capable of reading an image of an original document in a flatbed (FB) style is known.

The reading apparatus in the flatbed style may be equipped with a reader device, which may read a line of image extending in a main scanning direction. The reader device may be arranged underneath a document placement table formed of a sheet of translucent glass and may reciprocate in a sub-scanning direction, which intersects orthogonally with the main scanning direction. For reading an image of the original document placed on the document placement table, the reading apparatus may determine a reading range to be read by the reader device and may operate the reader device to move in the sub-scanning direction within the reading range and read the image in the reading range line by line sequentially.

Before the reading range is determined, the reading apparatus may detect an origin point, which serves as a reference point to the reading range. For example, a lower surface of a cover that surrounds peripheries of the document placement table may have a black-and-white pattern, in which white areas and black areas adjoin one another in the main scanning direction and the sub-scanning direction, and the reader device may read an image of the black-and-white pattern. Based on an outcome of reading, an intersecting position, at which a boundary between the white area and the black area adjoining in the main-scanning direction intersects with a boundary between the black area and the white area adjoining in the sub-scanning direction, may be detected to be used as the origin point.

The black-and-white pattern having the white areas and the black areas may be formed on a tape, and the tape may be attached to the lower surface of the cover manually. Therefore, the tape may be attached to a position deviated from a correct position, and the origin point may deviate from an originally designed position. When the origin point deviates from the designed position, the reading range may not be determined correctly.

In this regard, a dent with edges extending along the main scanning direction and the sub-scanning direction may be formed on the lower surface of the cover. The reader device may read images of the dent and peripheries of the dent and, based on the outcome of reading, detect positions of the edges of the dent along the main scanning direction and the sub-scanning direction. The reading range to be determined with reference to the origin point may be corrected based on a reference point in the cover. The dent may be formed in the cover when the cover is manufactured; therefore, the reference point in the cover may not substantially vary from other covers from the factory. Therefore, the reading range may be corrected accurately.

DESCRIPTION

In the meantime, when the cover is colored in a dark color such as black, an amount of light reflected off the dent and an amount of light reflected off the peripheral areas may not differ largely, and the positions of the edges of the dent may not be detected accurately. In this regard, the reading range may not be corrected accurately.

The present disclosure is advantageous in that a reading apparatus, which may determine a reading range to be read by a reader device preferably, is provided.

With reference to the accompanying drawings, an embodiment of the present disclosure will be described below.

<Configuration of Reading Apparatus>

Figure 1:
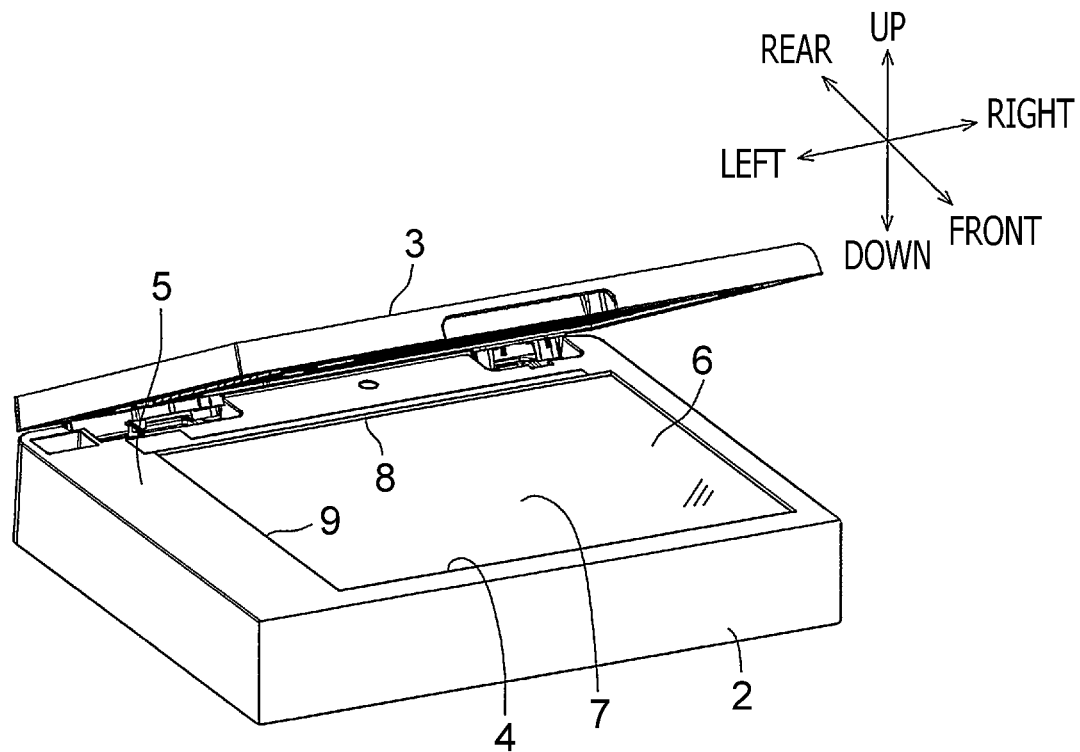
FIG. 1 is a perspective view of a reading apparatus.

A reading apparatus 1 shown in FIG. 1 is in a flatbed (FB)-styled reading apparatus capable of reading an image of an original document. For example, the reading apparatus 1 may form, together with a printing apparatus (not shown) capable of printing images from image data on sheets, a multi-function peripheral (MFP) having multiple functions such as a reading function and a printing function. In such an MFP, for example, the reading apparatus 1 may be arranged on top of the printing apparatus.

The reading apparatus 1 has a housing 2 having a form of a substantially rectangular box and a document cover 3 to open or close an upper face of the housing 2. The document cover 3 is swingable on an axis, which extends along an edge of the housing 2. The document cover 3 may swing to move between an open position, in which the document cover 3 is lifted from the upper face of the housing 2 to expose the upper face, and a closed position, in which the document cover 3 lies over the upper face of the housing 2 to cover the upper face.

In the following description, a side of the reading apparatus 1, on which the swing axis of the document cover 3 is located, will be called a rear side, and a side opposite to the rear side will be called a front side. A right-hand side and a left-hand side to a user who stands to face the front side of the reading apparatus 1 will be defined as a rightward side and a leftward side, respectively. An upper side and a lower side of the reading apparatus 1 will be defined in a setting where the reading apparatus 1 is placed on a horizontal plane. A front-to-rear or rear-to-front direction may be called as a front-rear direction, a left-to-right or right-to-left direction may be called as a widthwise direction, and an up-to-down or down-to-up direction may be called as a vertical direction.

A top panel 5 of the housing 2 has an opening 4 in a rectangular form, which has edges extending in the front-rear direction and the widthwise direction. In the housing 2, a document placement table 6 is arranged. The document placement table 6 has a sheet of translucent glass that closes the opening 4 from the lower side. The top panel 5 is a covering that covers peripheries of the document placement table 6 from the upper side and supports peripheral edges of the document placement table 6. Optionally, the document placement table 6 may have other translucent sheet such as a sheet of translucent resin in place of the sheet of glass.

An upper face of the document placement table 6 is a flat plane providing a placement surface 7, on which an original document may be placed. A rectangular area on the placement surface 7 exposed through the opening 4 is defined as a document placement area. The original document may be located in the rectangular area in an orientation such that a corner thereof abuts on a rear-leftward corner of the opening 4, where a rear edge 8 and a leftward edge 9 meet.

Figure 2:
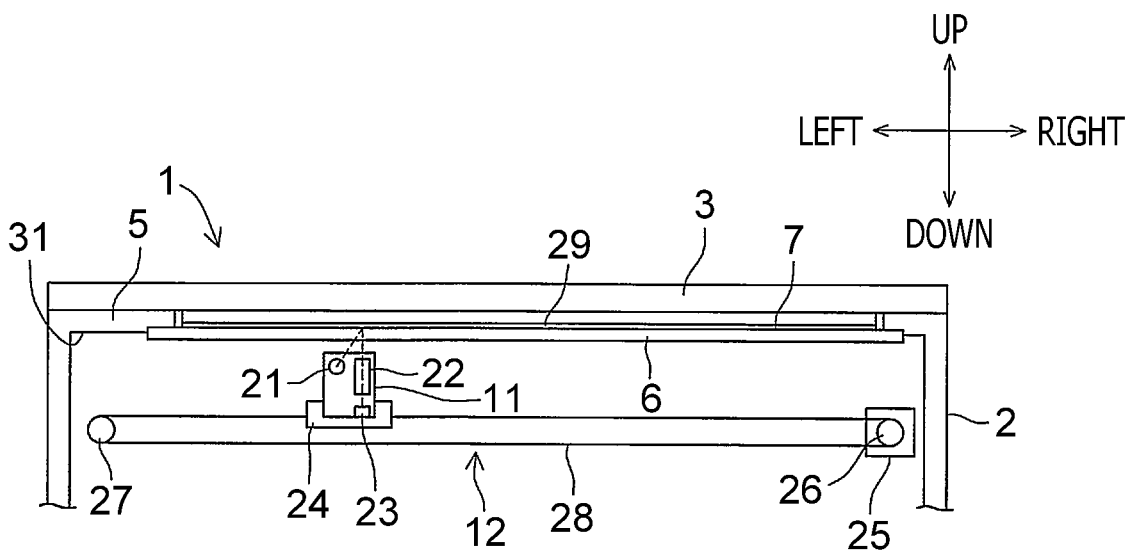
FIG. 2 is an illustrative cross-sectional view of the reading apparatus.

On a lower side of the document placement table 6, as shown in FIG. 2, a contact image sensor (CIS) unit 11 and a movable assembly 12 are arranged.

The CIS unit 11 includes a light source 21, a rod lens array 22, and an image sensor 23. The light source 21 includes light emitting diodes (LEDs) in three colors of red (R), green (G), and blue (B). The light source 21 is controlled to flash on and off by pulse width modulation. The rod lens array 22 has a plurality of rod lenses arrayed along a main scanning direction. The main scanning direction coincides with the front-rear direction. The rod lenses are gradient-index lenses in erecting equal magnification. The image sensor 23 may be, for example, linear image sensor, in which a plurality of photoreceivers are arrayed at equal pitch along the main scanning direction.

The light from the light source 21 may reflect off a surface of a readable object, i.e., an original document, and the reflected light may enter the image sensor 23 through the rod lens array 22. As the light enters the image sensor 23, the photoreceivers in the image sensor 23 may output voltages according to photoelectric conversion. The voltages output from the photoreceivers may be amplified in a gain adjustment circuit and converted by an A/D conversion circuit into digital pixel values. The A/D conversion circuit may have, for example, a resolution of 8 bits (0-255) and convert the voltages, i.e., electric signals, output from the image sensor 23 representing the RGB colors into digital pixel values. For example, voltages lower than a lower reference voltage, i.e., a lower limit value, may be uniformly converted to zero (0), voltages higher than a higher reference voltage, i.e., a higher limit value, may be uniformly converted to 255, and voltages between the lower limit value and the upper limit value may be converted to pixel values that are corresponding to levels of the voltages. With the voltages output from the photoreceivers arrayed in line converted into the pixel values, a line of image of the readable object extending in the main scanning direction may be read by the CIS unit 11.

The movable assembly 12 may move the CIS unit 11 in a sub-scanning direction, which intersects orthogonally with the main scanning direction. The sub-scanning direction coincides with the widthwise direction. The movable assembly 12 includes a carriage 24, a motor 25, a driving pulley 26, a driven pulley 27, and a belt 28. The carriage 24 may carry the CIS unit 11. The motor 25 may be a stepping motor, which may rotate bidirectionally. The driving pulley 26 may be driven by the motor 25 to rotate, and the driven pulley 27 paired with the driving pulley 26 may rotate along with the rotation of the driving pulley 26. The belt 28 is strained around the driving pulley 26 and the driven pulley 27. The driving pulley 26 is located on a rightward side in the housing 2 with a rotation axis thereof extending in the front-rear direction. The driven pulley 27 is located on a leftward side of the housing 2 with a rotation axis thereof extending in the front-rear direction at a vertically equal position to the rotation axis of the driving pulley 26. As the driving pulley 26 rotate, the belt 28 may run, and as the belt 28 run, the carriage 24 may move along a guide (not shown) in the sub-scanning direction, which coincides with the widthwise direction.

For reading the original document, the document cover 3 may be located at the open position, and the original document may be placed on the placement surface 7 of the document placement table 6 with a back side thereof facing upward. With the original document placed on the placement surface 7, the document cover 3 may be located at the closes position to cover the original document. On a lower side of the document cover 3, a document presser 29 being a sheet of white resin is resiliently supported. The document presser 29 may have a rectangular form with rounded corners in a size substantially smaller than the opening 4. When the document cover 3 is closed, the document presser 29 does not overlap peripheral edges of the opening 4 in the housing 2 but stays inside the opening 4 apart from corners of the opening 4 and presses the original document against the document placement table 6.

With the original document set on the placement surface 7, a command for start reading may be input in the reading apparatus 1, and a reading range to be read by the CIS unit 11 may be determined. The movable assembly 12 may move the CIS unit 11 from left to right in the sub-scanning direction within the reading range, and the CIS unit 11 may read an image of the original document line by line in synchronization with the movement of the movable assembly 12.

<White-Black Pattern>

Figure 3:
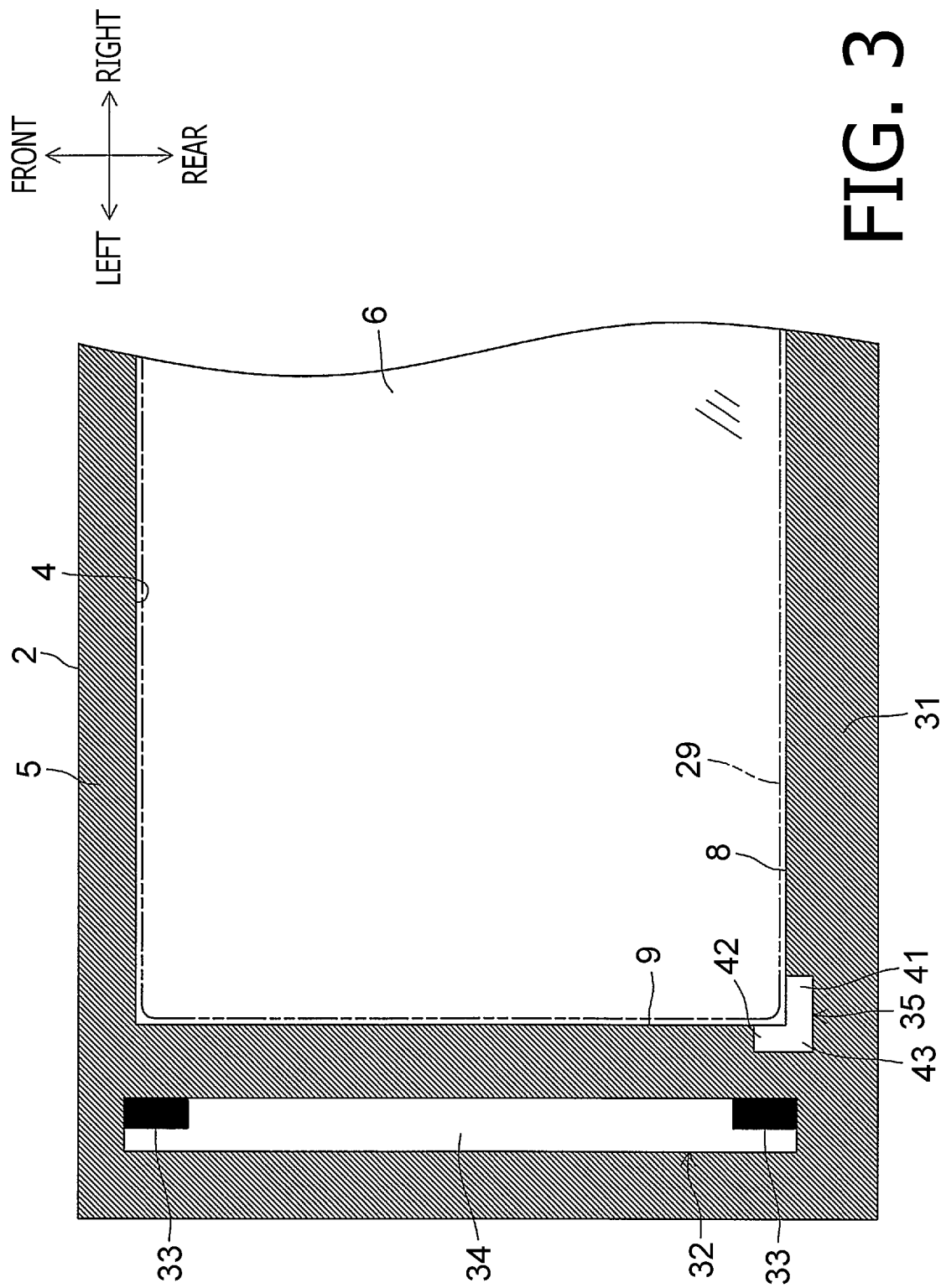
FIG. 3 is an upward plan view of a top panel and a document placement table in the reading apparatus viewed from a lower side.

For determining the reading range to be read by the CIS unit 11, the reading apparatus 1 is provided with a white-black pattern 32, as shown in FIG. 3, on an inner surface 31, which is a downward surface of the top panel 5 of the housing 2 facing the CIS unit 11, at a position leftward apart from the leftward edge 9 of the opening 4. The white-black pattern 32 is a piece of tape having a rectangular form elongated in the front-rear direction, which coincides with the main scanning direction, attached to the inner surface 31 of the top panel 5 of the housing 2. The white-black pattern 32 has a black area 33 in a rectangular shape and a white area 34 being a remainder of the white-black pattern 32. The black area 33 is located at a front-rightward corner and a rear-rightward corner. In this arrangement, in an area along a rightward edge of the white-black pattern 32, the white area 34 is interposed between the two black areas 33, and the black areas 33 and the white area 34 adjoin each other continuously. In an area along a frontward edge of the white-black pattern 32, the white area 34 is on a leftward side of the black area 33, and the black area 33 and the white area 34 adjoin continuously with each other.

<Colored Part>

The housing 2 and the document cover 3 are made of black resin. Therefore, a color of the inner surface 31 of the top panel 5 of the housing 2 is black. In FIG. 3, the black color of the inner surface 31 is expressed in hatching. Moreover, a color of a surface of the document cover 3 facing the document placement table 6 is black.

The inner surface 31 has a colored part 35, which is located to adjoin the rear-leftward corner of the opening 4. The colored part 35 is a part of the inner surface 31 of the top panel 5 colored in white along the rear edge 8 and the leftward edge 9 of the opening 4. In particular, the colored part 35 is formed in an L-shape, having a first part 41, a second part 42, and a third part 43. The first part 41 is a rectangular area on the inner surface 31 colored in white longitudinally along the rear edge 8 of the opening 4. The second part 42 is a rectangular area on the inner surface 31 colored in white longitudinally along the leftward edge 9 of the opening 4. The third part 43 is a rectangular area colored in white and connecting the first part 41 and the second part 42 on the inner surface 31. The colored part 35 may be formed, for example, in a printing method such as silk printing and pad printing.

<Electric Configuration>

Figure 4:
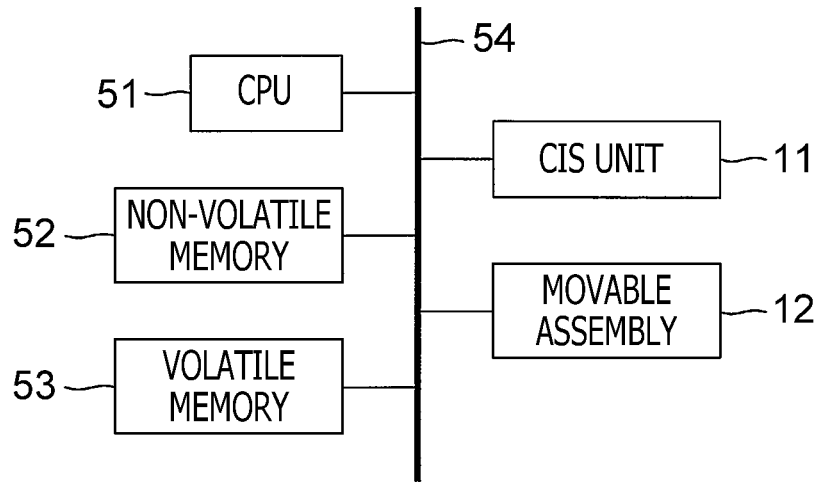
FIG. 4 is a block diagram to illustrate an electric configuration of the reading apparatus.
Figure 5:
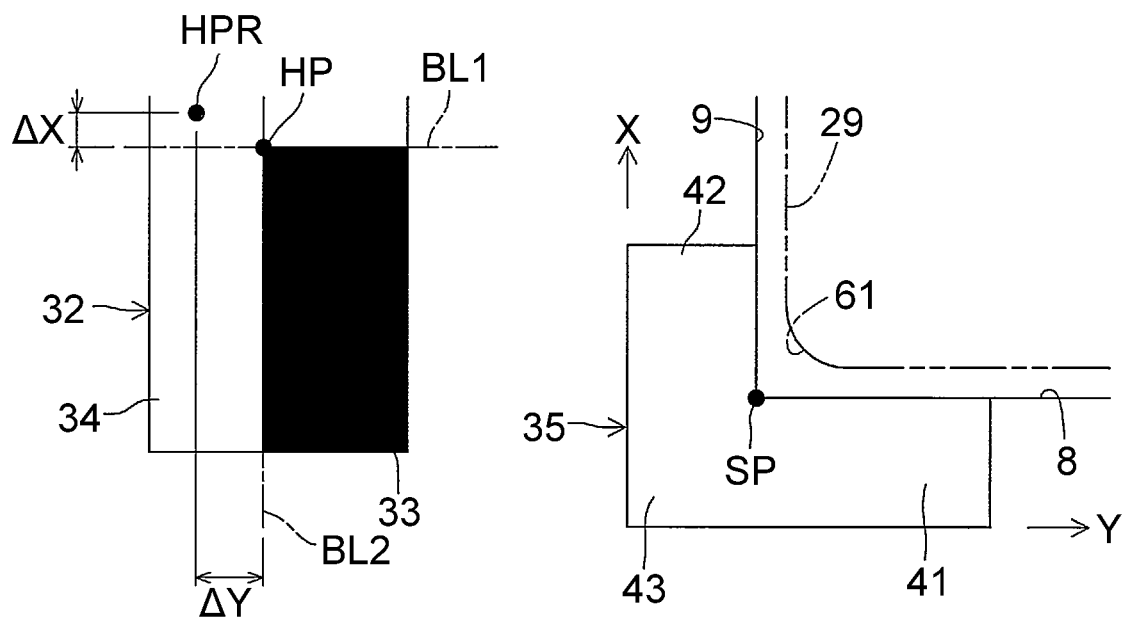
FIG. 5 illustrates deviation between a designed home position and a detected home position.

The reading apparatus 1 has, as shown in FIG. 4, a central processing unit (CPU) 51, a non-volatile memory 52 such as a flash memory and EEPROM that are rewritable, and a volatile memory 53 such as SDRAM. The CPU 51, the non-volatile memory 52, and the volatile memory 53 are connected through a bus 54 for data communication.

The CPU 51 may run programs for processing varieties of data and control movements of the devices in the reading apparatus 1 including the CIS unit 11 and the movable assembly 12. The non-volatile memory 52 stores the programs to be run by the CPU 51 and data to be used in the programs. The volatile memory 53 may be used as a work area for running the programs by the CPU 51.

<Correction Value Acquiring Process>

The reading range to be read by the CIS unit 11 is expressed by coordinates in Cartesian coordinate system, in which a home position HP is the coordinate origin. The home position HP is an intersection of a boundary BL 1, which is between the rearward one of the black areas 33 and the white area 34, and a boundary BL2, which is between the rearward one of the black areas 33 and the white area 34. In the Cartesian coordinate system, a frontward orientation along the main scanning direction is a positive orientation on an X axis, and a rightward orientation along the sub-scanning direction is a positive orientation on a Y axis.

The white-black pattern 32 may be attached to the inner surface 31 of the top panel 5 of the housing 2 manually. Therefore, occasionally, the white-black pattern 32 may be attached to a position deviated from a correct position, and the home position HP may deviate from a designed home position HPR. The reading range to be read by the CIS unit 11 is set to a range having predetermined lengths in the main scanning direction (X-direction) and in the sub-scanning direction (Y-direction) from a read-start point SP, which is an intersection of the rear edge 8 and the leftward edge 9 of the opening 4 formed in the top panel 5 of the housing 2. The opening 4 is formed in the top panel 5 when the housing 2 is produced from resin. Therefore, the position of the opening 4 may not deviate substantially from the designed position. In other words, positional relation between the designed home position HPR and the read-start point SP is constant. Therefore, as long as the home position HP coincides with the designed home position HPR, the CPU 51 may acquire the coordinates of the read-start point SP with reference to the home position HP being the coordinate origin based on the positional relation between the designed home position HPR and the read-start point SP and determine the reading range to be read by the CIS unit 11 accurately. However, when the home position HP deviates from the designed home position HPR, the CPU 51 may neither acquire the coordinates of the read-start point SP with reference to the home position HP being the coordinate origin based on the positional relation between the designed home position HPR and the read-start point SP nor determine the reading range to be read by the CIS unit 11 correctly. In order to determine the reading range correctly, it is necessary that the CPU 51 acquires a correction value, which is a deviated amount (ΔX, ΔY) of the home position HP with respect to the designed home position HPR.

For example, before shipping the reading apparatus 1 from factory, the CPU 51 may execute a correction value acquiring process to acquire the correction value (ΔX, ΔY).

Figure 6:
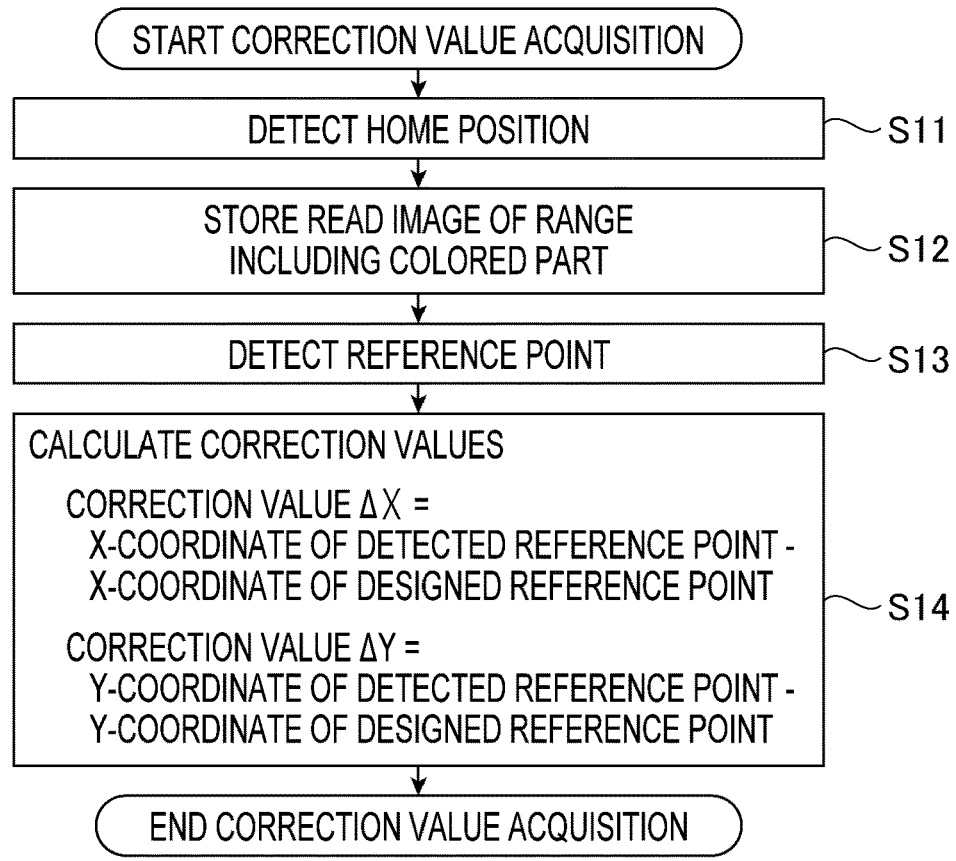
FIG. 6 is a flowchart to illustrate a flow of steps in a correction value acquiring process.

FIG. 6 shows a flow of the correction value acquiring process. In the correction value acquiring process, the CPU 51 detects a home position HP (S11). In particular, the CPU 51 operates the CIS unit 11 to read the white-black pattern 32. The CPU 51 searches through the image read by the CIS unit 11 for a position, at which pixel values of pixels adjoining in the X-direction (i.e., the main scanning direction) change beyond a white-black determination threshold. When the position to satisfy the condition is detected, the CPU 51 determines the detected position to be a position of the boundary BL1 in the main scanning direction. Further, the CPU 51 searches for a position, at which pixel values of pixels adjoining in the Y-direction (i.e., the sub-scanning direction) change beyond the white-black determination threshold. When the position to satisfy the condition is detected, the CPU 51 determines the detected position to be a position of the boundary BL2 in the sub-scanning direction. Thereby, the home position HP being the intersection of the boundaries BL1, BL2 is detected. The CPU 51 sets an XY-Cartesian coordinate system with the coordinate origin being the home position HP.

The CPU 51 operates the CIS unit 11 to read a predetermined objective range in an image and stores data of the image read by the CIS unit 11 in the volatile memory 53 (S12). The objective range is a range including the colored part 35 and peripheries of the colored part 35.

Figure 7:
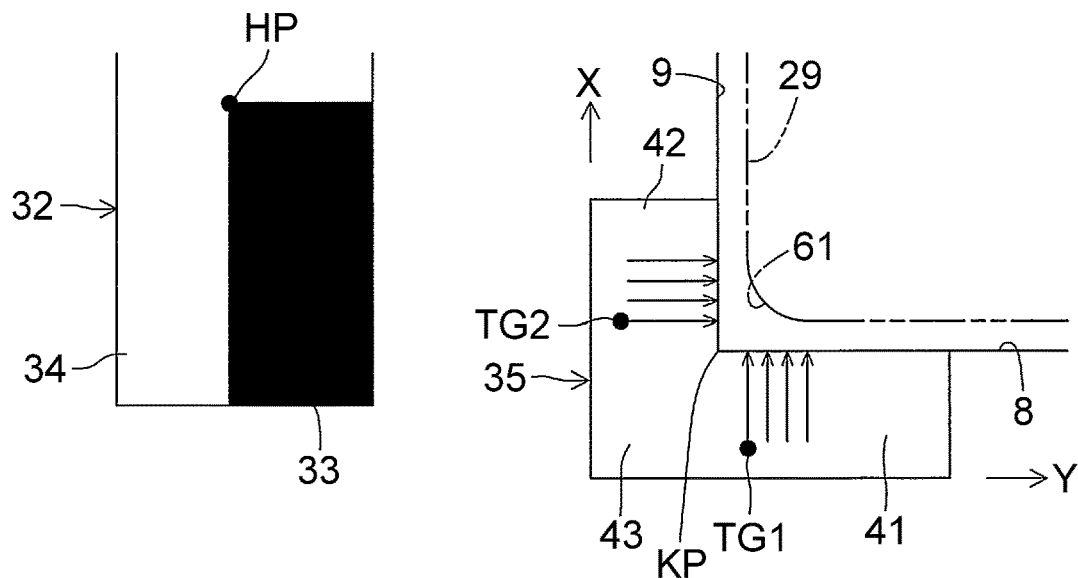
FIG. 7 illustrates how a reference point is searched.

The CPU 51 sets the intersection of the rear edge 8 and the leftward edge 9 of the opening 4 formed in the top panel 5 of the housing 2 to be a reference point KP, as shown in FIG. 7, and detects the reference point KP in the image data of the objective range stored in the volatile memory 53 (S13).

In particular, in order to detect the X coordinate, i.e., a position in the X-direction, of the rear edge 8 of the opening 4, the CPU 51 sets a rectangular range, which includes a part of the rear edge 8 facing a round edge 61 on the rear-leftward corner of the document presser 29, as a search range and sets a position spaced apart from the rear edge 8 toward the negative side along the X axis as a search origin TG1. The CPU 51 examines the RGB pixel values of the pixels aligning continuously toward the positive side along the X axis from the search origin TG1 one by one and converts the pixel value of each of the pixels into a Y-component (luminance) value according to a predetermined conversion formula. The CPU 51 converts the pixel value of the RGB colors of each pixel into the Y-component value by, for example, combining the pixel value of the R color multiplied by 0.299, the pixel value of the G color multiplied by 0.587, and the pixel value of the B color multiplied by 0.114.

The CPU 51 determines whether the value of the Y-component in each pixel is greater than a threshold value. The first part 41 of the colored part 35 is colored in white; therefore, the values of the Y-component of the pixels acquired by the CIS unit 11 reading the first part 41 are greater than the threshold value. Meanwhile, between the rear edge 8 and the round edge 61 of the document presser 29, always a gap is created. While the document cover 3 is made of black resin, the photoreceivers in the CIS unit 11 that face the gap may receive no substantial reflected light. Therefore, the values of the Y-component of the pixels acquired by the CIS unit 11 reading the gap between the rear edge 8 and the round edge 61 are smaller than or equal to the threshold value. When the CPU 51 firstly finds a pixel, of which value of the Y-component is smaller than or equal to the threshold value, the CPU 51 determines the pixel to be a prospective pixel forming the rear edge 8.

The CPU 51 repeats examining the pixels in the search range that are apart from one another by a predetermined distance from the search origin TG1 toward the positive side along the Y axis and determines whether the pixels are prospective pixels that form the rear edge 8. The CPU 51 may determine a plurality of prospective pixels forming the rear edge 8. The CPU 51 detects an average value among the X coordinates of the prospective pixels determined to form the rear edge 8 to be an X coordinate of the rear edge 8, i.e., X coordinate of the reference point KP.

Moreover, in order to detect the Y coordinate, i.e., a position in the Y-direction, of the leftward edge 9 of the opening 4, the CPU 51 sets a rectangular range, which includes a part of the leftward edge 9 facing the round edge 61 on the rear-leftward corner of the document presser 29, as a search range and sets a position spaced apart from the leftward edge 9 toward the negative side along the Y axis as a search origin TG2. The CPU 51 examines the RGB pixel values of the pixels aligning continuously toward the positive side along the Y axis from the search origin TG2 one by one and convert the pixel value of each or the pixels into the Y-component (luminance) value according to a predetermined conversion formula, which may be the same as the formula used to detect the X coordinate of the reference point KP.

The CPU 51 determines whether the value of the Y-component in each pixel is greater than the threshold value. The second part 42 of the colored part 35 is colored in white; therefore, the values of the Y-component of the pixels acquired by the CIS unit 11 reading the second part 42 are greater than the threshold value. Meanwhile, between the leftward edge 9 and the round edge 61 of the document presser 29, always a gap is created. While the document cover 3 is made of black resin, the photoreceivers in the CIS unit 11 that face the gap may receive no substantial reflected light. Therefore, the values of the Y-component of the pixels acquired by the CIS unit 11 reading the gap between the leftward edge 9 and the round edge 61 are smaller than or equal to the threshold value. When the CPU 51 firstly finds a pixel, of which value of the Y-component is smaller than or equal to the threshold value, the CPU 51 determines the pixel to be a prospective pixel forming the leftward edge 9.

The CPU 51 repeats examining the pixels in the search range that are apart from one another by a predetermined distance from the search origin TG2 toward the positive side along the X axis and determines whether the pixels are prospective pixels that form the leftward edge 9. The CPU 51 may determine a plurality of prospective pixels that form the leftward edge 9. The CPU 51 detects an average value among the Y coordinates of the prospective pixels determined to form the leftward edge 9 to be a Y coordinate of the leftward edge 9, i.e., Y coordinate of the reference point KP.

After determining the XY coordinates of the reference point KP, the CPU 51 subtracts the X coordinate of the designed reference point KP from the X coordinate of the detected reference point KP and determine a value being a result of the subtraction to be the correction value $\Delta X$ in the X-direction (S14). Moreover, the CPU 51 subtracts the Y coordinate of the designed reference point KP from the Y coordinate of the detected reference point KP and determine a value being a result of the subtraction to be the correction value $\Delta Y$ in the Y-direction (S14). The X coordinate and the Y coordinate of the designed reference point KP are the X coordinate and the Y coordinate of the reference point KP in the XY Cartesian coordinate system having the designed home position HPR as the coordinate origin and are known and stored in the non-volatile memory 52. The CPU 51 stores the determined correction values ($\Delta X$, $\Delta Y$) in the non-volatile memory 52.

<Reading Range Determining Process>

Figure 8:
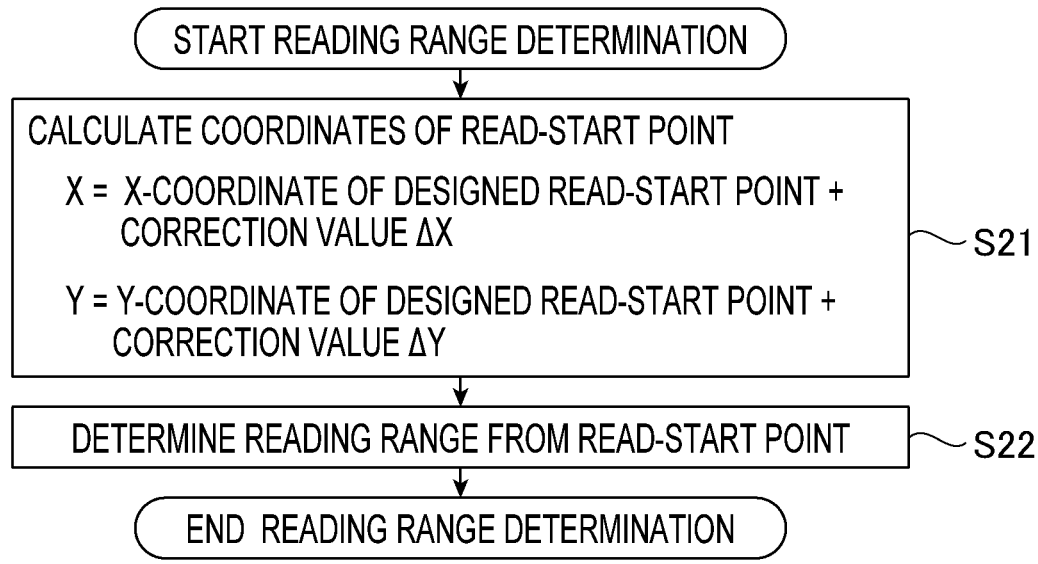
FIG. 8 is a flowchart to illustrate a flow of steps in a reading range determining process.

When a read-start command is input in the reading apparatus 1, the CPU 51 executes a reading range determining process as shown in FIG. 8 and determines the reading range to be read by the CIS unit 11.

In the reading range determining process, the CPU 51 reads the X and Y coordinates of the designed read-start point SP in the non-volatile memory 52. The X and Y coordinates of the designed read-start point SP are equal to the X and Y coordinates of the reference point KP and are stored in the non-volatile memory 52. Moreover, the CPU 51 reads the correction values ($\Delta X$, $\Delta Y$) from the non-volatile memory 52. The CPU 51 adds the correction value $\Delta X$ to the X coordinate of the designed read-start point SP and determines a value being a result of the addition to be the X coordinate of the read-start point SP (S21). Moreover, the CPU 51 adds the correction value $\Delta Y$ to the Y coordinate of the designed read-start point SP and determine a value being a result of the addition to be the Y coordinate of the read-start point SP (S21).

The CPU 51 determines a range having the predetermined lengths in the main scanning direction and the sub-scanning direction from the read-start point SP to be the reading range (S22).

<Benefits>

As described above, the document placement table 6 is made of a translucent material and has the placement surface 7, on which the original document may be placed. On the side of the document placement table 6 opposite to the placement surface 7, the CIS unit 11 having the plurality of photoreceivers arrayed along the main scanning direction is arranged movably in the sub-scanning direction. In the top panel 5 of the housing 2 covering the peripheries of the document placement table 6 from the side of the placement surface 7, the opening 4 with the rear edge 8 extending in the main scanning direction and the leftward edge 9 extending in the sub-scanning direction is formed on the inner surface 31, which is the plane facing the CIS unit 11. The inner surface 31 of the top panel 5 has the colored part 35 extending along the rear edge 8 and the leftward edge 9. Accordingly, the colored part 35 and the part adjoining the colored part 35 have different reflection rates.

In order to determine the reading range in the original document to be read by the CIS unit 11, the CIS unit 11 may read the white-black pattern 32. Based on the outcome of reading the white-black pattern 32, the position of the boundary BL1 between the black area 33 and the white area 34 that adjoin in the main scanning direction and the position of the boundary BL2 between the black area 33 and the white area 34 that adjoin in the sub-scanning direction may be detected.

The CIS unit 11 may read the colored part 35 and the peripheries of the colored part 35 and set the XY Cartesian coordinate system having the coordinate origin at the home position HP, which is at the position of the boundary BL1 and the boundary BL2. Based on the outcome of reading, the X coordinate indicating the position of the rear edge 8 in the main scanning direction and the Y coordinate indicating the position of the leftward edge 9 in the sub-scanning direction may be detected. While the colored part 35 and the part adjoining the colored part 35 have the different reflection rates, based on the outcome of reading of the colored part 35 and the peripheries of the colored part 35, the X coordinate of the rear edge 8 and the Y coordinate of the leftward edge 9, i.e., the X and Y coordinates of the reference point KP which is the intersection of the rear edge 8 and the leftward edge 9, may be detected accurately.

The X coordinate of the designed reference point KP is subtracted from the X coordinate of the detected reference point KP, and the value of the subtracted result is determined to be the correction value ΔX in the X-direction. The Y coordinate of the designed reference point KP is subtracted from the Y coordinate of the detected reference point KP, and the value of the subtracted result is determined to be the correction value ΔY in the Y-direction. The correction value ΔX is added to the X coordinate of the designed read-start point SP, and the added value is determined to be the X coordinate of the read-start point SP. The correction value ΔY is added to the Y coordinate of the designed read-start point SP, and the added value is determined to be the Y coordinate of the read-start point SP. The reading range of the image to be read by the CIS unit 11 is determined to be the range having the predetermined lengths in the main scanning direction and the sub-scanning direction from the read-start point SP.

Thus, the X and Y coordinates of the reference point KP may be detected accurately, and based on the X and Y coordinates of the reference point KP, the reading range in the original document to be read by the CIS unit 11 may be determined preferably.

<More Examples>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, in the embodiment described above, the inner surface 31 of the top panel 5 of the housing 2 is colored in black, the document presser 29 is colored in white, and the colored part 35 is colored in white, which is the same color as the document presser 29. However, the color of the colored part 35 may not necessarily be limited to white being the same color as the document presser 29 as long as the colored part 35 is in a color different from the inner surface 31.

Figure 9:
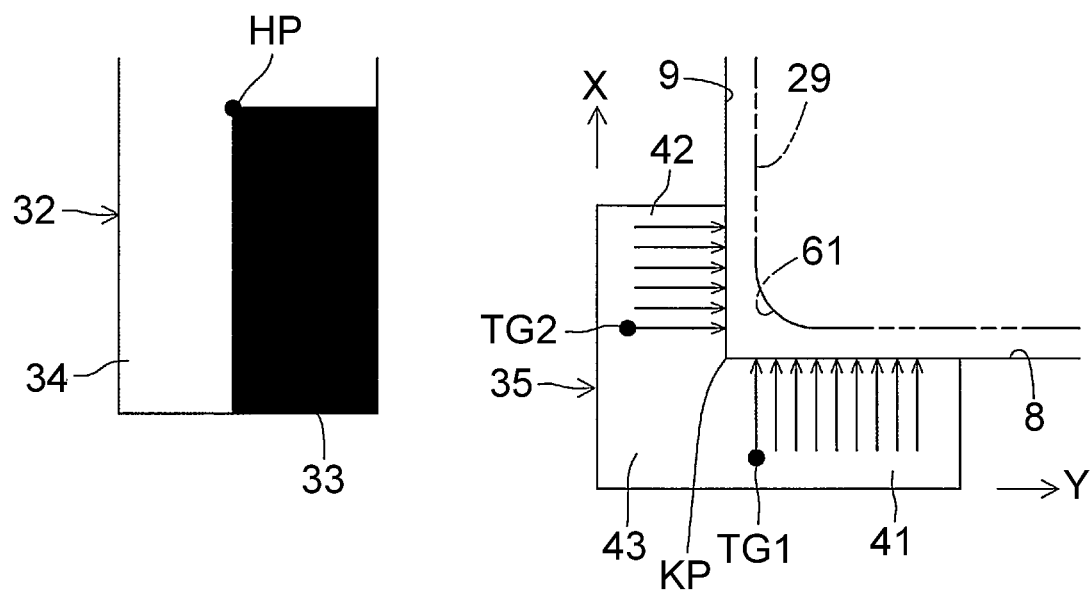
FIG. 9 illustrates how a reference point is searched in a reading apparatus with a colored area being colored in a different color.

When the colored part 35 is in a color different from white or black, for detecting the X coordinate of the reference point KP, a rectangular range, which includes a part of the rear edge 8 facing the round edge 61 on the rear-leftward corner of the document presser 29 and a linear part of the rear edge 8 extending rightward from the round edge 61, as shown in FIG. 9, may be set as the search range.

The CPU 51 may examine the RGB pixel values of the pixels aligning continuously toward the positive side along the X axis from the search origin TG1 one by one and convert the pixel value of each of the pixels into a Cb-component (color difference) value and a Cr-component (color difference) value according to a predetermined conversion formula. The CPU 51 may convert the pixel value of the RGB colors of each pixel into the Cb-component values by, for example, combining the pixel value of the R color multiplied by −0.16874, the pixel value of the G color multiplied by −0.33126, and the pixel value of the B color multiplied by 0.50000. Moreover, the CPU 51 may convert the pixel values of the RGB colors of each of the pixels into a Cr-component value by, for example, combining the pixel value of the R color multiplied by 0.50000, the pixel value of the G color multiplied by −0.41869, and the pixel value of the B color multiplied by −0081. The CPU 51 may combine a squared value of the Cb-component value and a squared value of the Cr-component value and obtain a square root of the combined values as an absolute value of the Cb component and the Cr component. When the CPU 51 firstly finds a pixel, of which absolute value of the Cb-component and the Cr-component is smaller than or equal to a threshold value, the CPU 51 may determine the pixel to be a prospective pixel forming the rear edge 8.

For detecting the Y coordinate of the reference point KP, a rectangular range, which includes a part of the leftward edge 9 facing the round edge 61 on the rear-leftward corner of the document presser 29 and a linear part of the leftward edge 9 extending frontward from the round edge 61 may be set as the search range. The CPU 51 may examine the RGB pixel values of the pixels aligning continuously toward the positive side along the Y axis from the search origin TG2 one by one and convert the pixel value of the RGB colors of each of the pixels into Cb-component (color difference) value and Cr-component (color difference) value according to a predetermined conversion formula, which may be the same as the formula used to detect the X coordinate of the reference point KP. When the CPU 51 firstly finds a pixel, of which absolute value of the Cb-component and the Cr-component is smaller than or equal to the threshold value, the CPU 51 may determine the pixel to be a prospective pixel forming the leftward edge 9.

The X coordinate of the reference point KP based on the X coordinates of the prospective pixels for the rear edge 8 and the Y coordinate of the reference point KP based on the Y coordinates of the prospective pixels for the leftward edge 9 may be determined in the same manner as the embodiment described earlier.

For another example, the colored part 35 may not necessarily be formed in the L-shape having the first part 41, which is the rectangular area elongated along the rear edge 8 of the opening 4 colored in white, the second part 42, which is the rectangular area elongated along the leftward edge 9 of the opening 4 colored in white, and the third part 43, which is the rectangular area connecting the first part 41 and the second part 42 colored in white. For example, the colored part 35 may be in a form having the first part 41, which is the rectangular area elongated along the rear edge 8 of the opening 4 colored in white, and the second part 42, which is the rectangular area elongated along the leftward edge 9 of the opening colored in white, where the first part 41 and the second part 42 are separated without being connected by the third part 43.

For another example, the reading apparatus 1 may not necessarily be equipped with the single CPU 51 to execute the processes but may be equipped with a plurality of CPUs, which may cooperate to execute the processes.

What is claimed is:

1. A reading apparatus, comprising:
   a document placement table having a placement surface, on which a document is placeable, on one side thereof;

a cover covering peripheries of the document placement table from the side of the document placement table having the placement surface;

a reader located on a side of the document placement table opposite to the placement surface, the reader having a plurality of photoreceivers arrayed along a main scanning direction being parallel to the placement surface, the reader being movable in a sub-scanning direction, the sub-scanning direction being parallel to the placement surface and orthogonal to the main scanning direction, the reader being configured to read an image of a readable object through the photoreceivers receiving light reflected off the readable object; and a controller, wherein the cover has, on a facing surface thereof that faces the reader, a reference section having a first edge extending in the sub-scanning direction and a second edge extending in the main scanning direction, and a colored part on peripheries of the reference section, the colored part being colored along the first edge and along the second edge, and wherein the controller is configured to:
  operate the reader to read the colored part and peripheries of the colored part,
  detect a first position being a position of the first edge in the main scanning direction and a second position being a position of the second edge in the sub-scanning direction in an outcome of reading of the colored part and the peripheries of the colored part, and
  determine a reading range in the document to be read by the reader based on the first position and the second position.

2. The reading apparatus according to claim 1, wherein the colored part is colored in a color different from a color of the facing surface of the cover.

3. The reading apparatus according to claim 2, wherein the colored part is colored in white, and wherein the color of the facing surface of the cover is black.

4. The reading apparatus according to claim 1, wherein the first edge and the second edge of the reference section form a part of an opening, through which the placement surface of the document placement table is exposed from the cover.

5. The reading apparatus according to claim 4, further comprising:
  a document presser arranged on the side of the document placement table having the placement surface, the document presser being movable between an open position, at which the document presser exposes the placement surface, and a closed position, at which the document presser presses the document against the placement surface,
  wherein the colored part is colored in a same color as a color of a surface of the document presser to press the document, and
  wherein the controller operates the reader to read the colored part and the peripheries of the colored part, the peripheries being a part of the document placement table located on an outer side of the document presser being at the closed position.

6. The reading apparatus according to claim 4, further comprising:
  a document presser arranged on the side of the document placement table having the placement surface, the document presser being movable between an open position, at which the document presser exposes the placement surface, and a closed position, at which the document presser presses the document against the placement surface,
  wherein the colored part is colored in a color different from a color of a surface of the document presser to press the document, and
  wherein the controller operates the reader to read the colored part and the peripheries of the colored part, the peripheries including at least a part of the document placement table where the document presser being at the closed position faces.

7. The reading apparatus according to claim 1, further comprising:
  a white-black pattern arranged on the facing surface of the cover at a position separated from the document placement table in the sub-scanning direction, the white-black pattern having a white area and a black area adjoining the white area in the sub-scanning direction,
  wherein the controller is configured to operate the reader to read the white-black pattern, determine a third position being a position of a boundary between the white area and the black area, and determine the reading range based on the first position, the second position, and the third position.

8. The reading apparatus according to claim 7, wherein the white area adjoins the black area in the main scanning direction and in the sub-scanning direction, and
  wherein the controller is configured to operate the reader to read the white-black pattern, determine the third position being a position of a boundary between the white area and the black area adjoining in the sub-scanning direction and a fourth position being a position of a boundary between the white area and the black area adjoining in the main scanning direction, and determine the reading range based on the first position, the second position, the third position, and the fourth position.

9. The reading apparatus according to claim 8, further comprising a storage, the storage storing coordinates of a designed reference point,
  wherein the controller is configured to determine the reading range to be read by the reader by:
    acquiring coordinates of a point coincident with the first position and the second position with reference to a coordinate origin, the coordinate origin being a point coincident with the third position and the fourth position, and
    correcting the reading range, the reading range being set with reference to a position of a designed coordinate origin, with use of a correction value, the correction value being a difference between the acquired coordinates of the point coincident with the first position and the second position and the coordinates of the designed reference point stored in the storage.

10. The reading apparatus according to claim 1, wherein the first edge and the second edge of the reference section intersect each other, and wherein a part of the colored part colored along the first edge and a part of the colored part colored along the second edge are connected to form an L-shape.

11. A reading apparatus, comprising:
  a document placement table made of a translucent material, the document placement table having a placement surface, on which a document is placeable, on one side thereof;

a cover covering peripheries of the document placement table from the side of the document placement table having the placement surface; and a reader located on a side of the document placement table opposite to the placement surface, the reader having a plurality of photoreceivers arrayed along a main scanning direction being parallel to the placement surface, the reader being movable in a sub-scanning direction, the sub-scanning direction being parallel to the placement surface and orthogonal to the main scanning direction, the reader being configured to read an image of a readable object through the photoreceivers receiving light reflected off the readable object, wherein the cover has, on a facing surface thereof that faces the reader, a reference section having a first edge extending in the sub-scanning direction and a second edge extending in the main scanning direction, and a colored part on peripheries of the reference section, the colored part being colored along the first edge and along the second edge in a color different from a color of the cover, and wherein the first edge and the second edge of the reference section form a part of an opening, through which the placement surface of the document placement table is exposed from the cover.

\* \* \* \* \*